United States Patent
Conti et al.

(10) Patent No.: US 12,214,872 B2
(45) Date of Patent: Feb. 4, 2025

(54) TIP END JOINT ARRANGEMENT FOR A ROTOR BLADE WITH RECONFIGURABLE ATTRIBUTES FOR STRUCTURAL AND AERODYNAMIC TUNING

(71) Applicant: Lockheed Martin Corporation, Bethesda, MD (US)

(72) Inventors: Timothy James Conti, Shelton, CT (US); Eric S. Parsons, Middlebury, CT (US); Joshua A. Breon, Lafayette, IN (US); Benjamin E. Isabella, Hamden, CT (US); William Paul Adams, Norwalk, CT (US); Christopher Michael Colschen, Hamden, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/132,330

(22) Filed: Apr. 7, 2023

(65) Prior Publication Data

US 2024/0336357 A1 Oct. 10, 2024

(51) Int. Cl.
*B64C 27/46* (2006.01)
*B64C 27/473* (2006.01)

(52) U.S. Cl.
CPC .......... *B64C 27/463* (2013.01); *B64C 27/473* (2013.01)

(58) Field of Classification Search
None
See application file for complete search history.

(56) References Cited

U.S. PATENT DOCUMENTS

| | | | |
|---|---|---|---|
| 2,842,214 A | 7/1958 | Prewitt | |
| 3,018,832 A | 1/1962 | Prewitt | |
| 3,999,888 A | 12/1976 | Zincone | |
| 7,118,343 B2 | 10/2006 | Loftus et al. | |
| 7,246,998 B2 * | 7/2007 | Kovalsky | B64C 27/473 |
| | | | 416/88 |
| 10,981,647 B2 | 4/2021 | Self et al. | |
| 11,254,424 B2 | 2/2022 | Baldwin et al. | |
| 2006/0104812 A1 * | 5/2006 | Kovalsky | B64C 27/463 |
| | | | 416/87 |
| 2020/0361600 A1 | 11/2020 | Pantalone et al. | |

FOREIGN PATENT DOCUMENTS

| | | | |
|---|---|---|---|
| GB | 0 831 508 A | 3/1960 | |
| WO | WO-03011689 A1 * | 2/2003 | ........... B64C 27/008 |
| WO | WO-2009/079161 A2 | 6/2009 | |
| WO | WO-2015/187224 A2 | 12/2015 | |

OTHER PUBLICATIONS

Extended European Search Report on European Patent Application No. 24168631.0 dated Sep. 5, 2024 (8 pages).

* cited by examiner

*Primary Examiner* — Juan G Flores
(74) *Attorney, Agent, or Firm* — Foley & Lardner LLP

(57) ABSTRACT

A rotor blade configured to be installed on a rotary-wing aircraft includes a main blade body including an inboard end configured to be coupled to a rotor blade hub and an outboard end. The rotor blade includes a blade tip removably coupled to the outboard end of the main blade body, the blade tip including an inner cavity. The rotor blade further includes a tip block including an inboard portion coupled to the outboard end of the main blade body and a cantilevered portion extending beyond the outboard end of the rotor blade and into the inner cavity of the blade tip.

17 Claims, 16 Drawing Sheets

TIP END JOINT ARRANGEMENT FOR A ROTOR BLADE WITH RECONFIGURABLE ATTRIBUTES FOR STRUCTURAL AND AERODYNAMIC TUNING

FIELD

The present disclosure relates to rotor blades, e.g., rotor blades utilizable with rotary wing aircraft, such as helicopters.

BACKGROUND

Rotary wing aircraft, such as helicopters, include rotor blades that must be adjusted to balance the rotor system. The balance is adjusted by adding various amounts of additional weight to each rotor blade.

SUMMARY OF THE INVENTION

The present disclosure describes a rotor blade with a tip block configured to receive a configurable weight cartridge for adjusting the balance of the rotor system and a tip rib for coupling the main blade body to the blade tip.

In general, methods for adjusting the amount of weight added to each rotor blade often require extensive assembly or disassembly of the rotor blade and the handling of multiple loose weights for installation within the rotor blade. The present disclosure allows for reduced assembly burden and handling.

In an exemplary aspect, a rotor blade configured to be installed on a rotary-wing aircraft is provided. The rotor blade includes a main blade body including an inboard end configured to be coupled to a rotor blade hub and an outboard end, a blade tip removably coupled to the outboard end of the main blade body, the blade tip including an inner cavity, and a tip block. The tip block includes an inboard portion coupled to the outboard end of the main blade body and a cantilevered portion extending beyond the outboard end of the main blade body and into the inner cavity of the blade tip.

In a further exemplary aspect, a tip block configured to be coupled to a rotor blade of a rotary wing aircraft is provided. The tip block includes an inboard portion configured to be coupled to a spar of the rotor blade, and an outboard portion configured to extend beyond an outboard end of the spar of the rotor blade. The outboard portion includes a first weight cup cavity configured to receive one or more weights for adjusting a balance of the rotor blade.

Figure 1A:
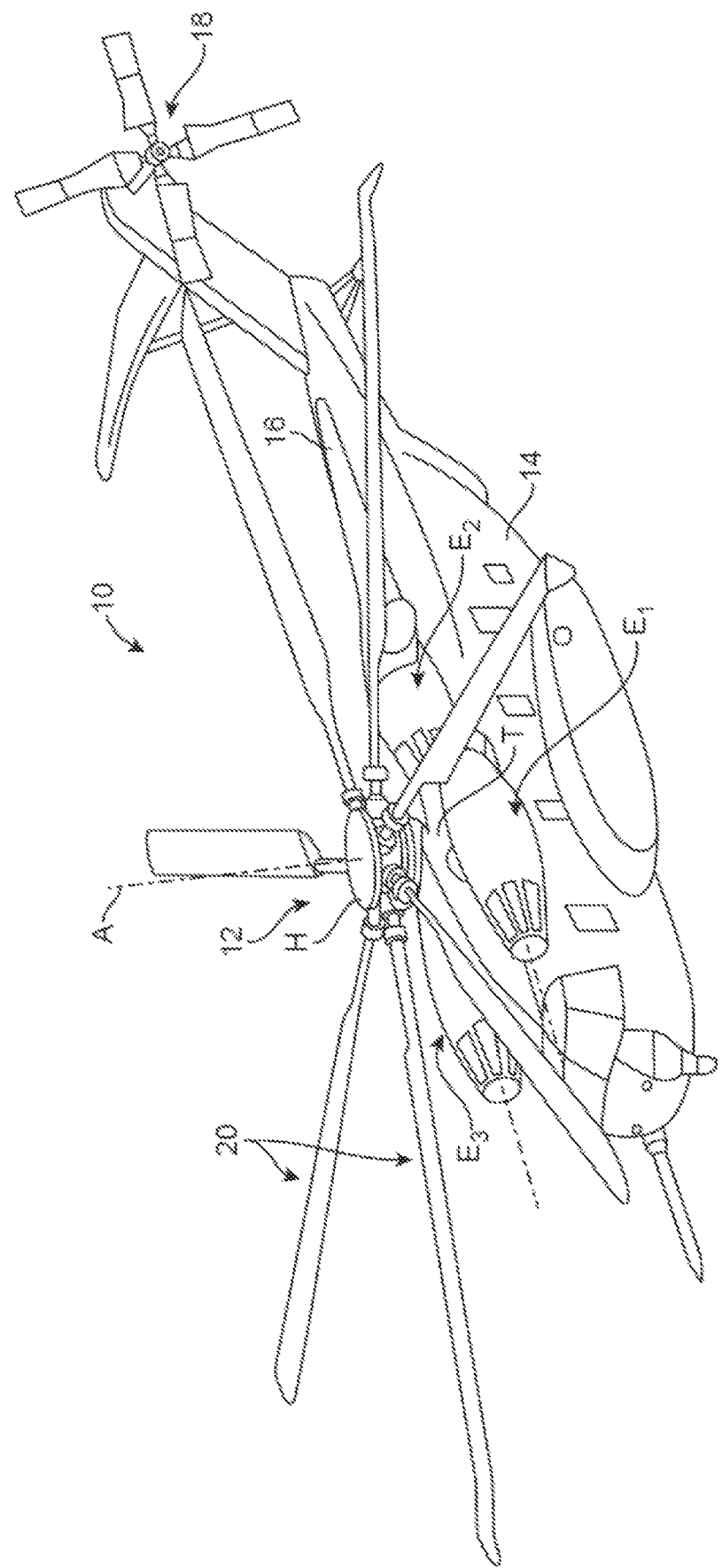
FIG. 1A is a perspective view of a rotary wing aircraft.

It will be recognized that the figures are the schematic representations for purposes of illustration. The figures are provided for the purpose of illustrating one or more implementations with the explicit understanding that the figures will not be used to limit the scope of the meaning of the claims.

DETAILED DESCRIPTION

Following below are more detailed descriptions of various concepts related to, and implementations of, methods and apparatuses for providing a tip end joint assembly for a rotor blade of a rotary wing aircraft. The various concepts introduced above and discussed in greater detail below may be implemented in any of a number of ways, as the described concepts are not limited to any particular manner of implementation. Examples of specific implementations and applications are provided primarily for illustrative purposes.

Overview

Referring to the figures generally, various embodiments disclosed herein relate to a tip end joint assembly for a rotary wing aircraft. As explained in more detail herein, the retention assembly according to certain exemplary non-limiting embodiments provides easier blade tip removal and replacement for specific missions or flight requirements. The tip end joint assembly may include a structural doubler (e.g., a doubler plate) that results in a more robust connection between the main blade body and the blade tip while eliminating countersinks or counterbores in the composite tip laminate that can cause stress concentrations. The rotor blade may be a lightweight blade that needs a substantial mass at the tip to maintain the autorotative index. The retention assembly may include an autorotative tip block coupled to an outboard end of the main blade body arranged in a cantilevered orientation extending into an inner cavity of the blade tip. The tip block includes weight cup cavities into which varying amounts of weight can be added to balance the rotor assembly and to adjust the balance of the rotor assembly. The arrangement and structure of the tip block allows for weight to be added and secured to the weight cup cavities without disrupting the upper aerodynamic surface of the blade. The tip block thus provides a static weight, while the adjustable weight cups allow the rotor blades to be balanced while providing additional autorotative weight. Positioning these weights near the blade tip provides for maximum angular momentum and efficiency.

Further, the tip block may not contact the blade tip at all, such that loads generated by the blade tip are transferred to the tip rib and the main blade body independently of the autorotative weight. The tip end joint assembly may include a benchtop configurable cartridge that can be installed in the weight cup cavities, rather than installing loose weights into the weight cup cavities. This allows for weight to be adjusted and wired (e.g., lockwired, safety-wired, safety-cabled, etc.) on a workbench rather than working with multiple loose items on the aircraft. The tip end joint assembly may further include a cover retention system to cover the fasteners that couple the tip block to the main blade body. The cover retention system is configured to reduce part count by replacing multiple washers with a retention plate that also provides anti-rotation features for the structural fasteners and threaded holes for receiving fasteners to couple an aerodynamic cover to the rotor blade.

Implementations described herein are related to a tip end joint assembly for joining a blade tip to a main blade body of a rotary wing aircraft and for providing a system for adjusting the balance of the rotor system. A tip rib may be coupled to the blade spar at the outboard end of the main blade body. The tip rib extends beyond the outboard tip of the main blade body and provides openings configured to receive fasteners to join the blade tip to the main blade body. The inboard end of the blade tip overlaps the tip rib and a doubler may be positioned above the overlapping portions. As used herein, "inboard" refers to a direction towards the rotor hub and root end of the rotor blade, and "outboard" refers to a direction away from the central hub and towards the outer end of the rotor blade. The doubler includes a flange configured to fit into a slot in the tip rib to provide centripetal force (e.g., a reaction to centripetal force) when the rotor blade is spinning. Fasteners are inserted through the doubler, blade tip, and tip rib such that the blade tip is held in double shear between the doubler and tip rib. A cover may then be installed over the structural fasteners to restore the aerodynamic surface.

A tip block may include an inboard portion that is inserted into an inner cavity of the tip rib. The tip rib and tip block may be inserted into an inner cavity of the blade spar from the outboard end of the main blade body and structural fasteners may be inserted through the spar, tip rib, and tip block to fasten the tip rib and tip block to the spar. An outboard portion of the tip block extends beyond the outboard tip of the main blade body and into an inner cavity of the blade tip. The outboard portion may include weight cup cavities for receiving adjustable weight cartridges.

Tip End Joint Assembly

Referring to FIG. 1A, an example of a vertical takeoff and landing (VTOL) rotary-wing aircraft 10 having a main rotor system 12, such as a helicopter, is illustrated. As shown, the aircraft 10 includes an airframe 14 having an extending tail 16, which mounts a tail rotor system 18, such as an anti-torque system. The main rotor system 12 is driven about an axis of rotation A via a main gearbox, illustrated schematically at T, by one or more engines, illustrated at E1-E3. The main rotor system 12 includes a plurality of rotor blades 20 mounted at their respective inboard ends to a rotor hub assembly H. The rotor blades 20 may be rotor blades in accordance with the embodiments described herein. Although a particular helicopter configuration is illustrated and described herein, other configurations and/or aircraft may be utilized in connection with the concepts described herein. For example, the techniques according to the present disclosure may be implemented in a variety of aircraft, including a high speed compound rotary wing aircraft with supplemental translational thrust systems, a dual contra-rotating rotary aircraft, coaxial rotor system aircraft, a tilt-rotor aircraft, and a tilt-wing aircraft. It should be understood that, as used herein, "inboard" refers to a radially inward direction towards the rotor hub assembly H, and "outboard" refers to a radially outward direction pointing away from the rotor hub assembly H and toward the distal tips of the rotor blades 20.

Figure 1B:
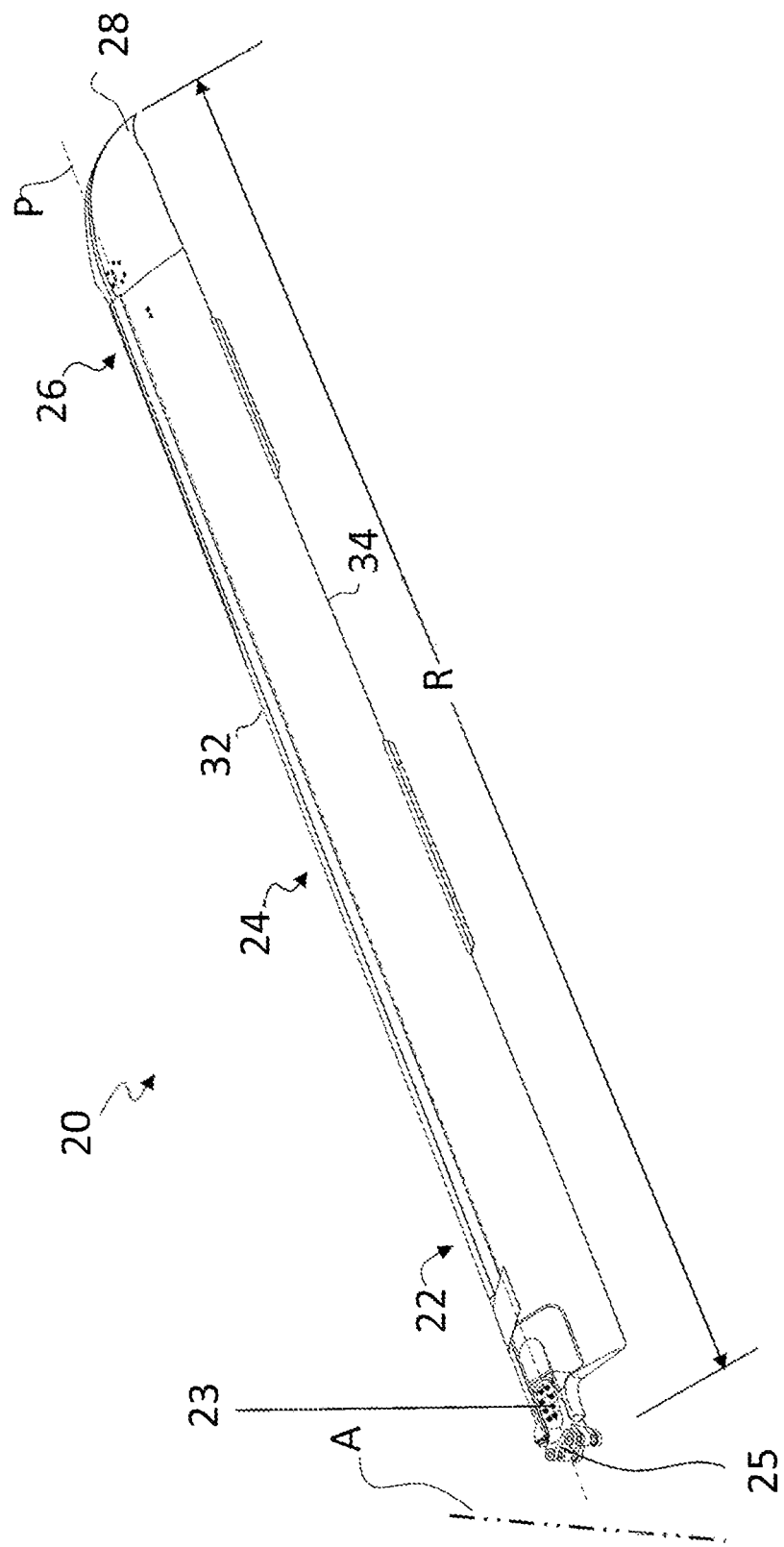
FIG. 1B is a perspective view of a rotor blade of a rotary wing aircraft.

Referring to FIG. 1B, each rotor blade 20 of the rotor assembly 12 generally includes a root section 22, an intermediate section 24 and a tip section 26. A blade cuff 23 is typically mounted at the inboard end 25 of the root section of the blade 20. Each rotor blade section 22, 24, 26 may define particular airfoil geometries to tailor the rotor blade aerodynamics to the velocity increase along the rotor blade span. As illustrated, the rotor blade tip section 26 may include an anhedral form (not shown); however, any angled or non-angled forms such as cathedral, gull, bent, and other non-straight forms are within the scope of the present disclosure. The anhedral form (not shown) as defined herein may include a rotor blade tip section 26 which extends at least partially out of a plane defined by the intermediate section 24.

The rotor blade sections 22, 24, 26 define a span R of the main rotor blade 20 between the axis of rotation A and a distal end 28 of the blade 20 such that any radial station may be expressed as a percentage of a blade radius (e.g., x/R). The rotor blade assembly 20 defines a longitudinal feathering axis P between a leading edge 32 and a trailing edge 34.

Figure 2:
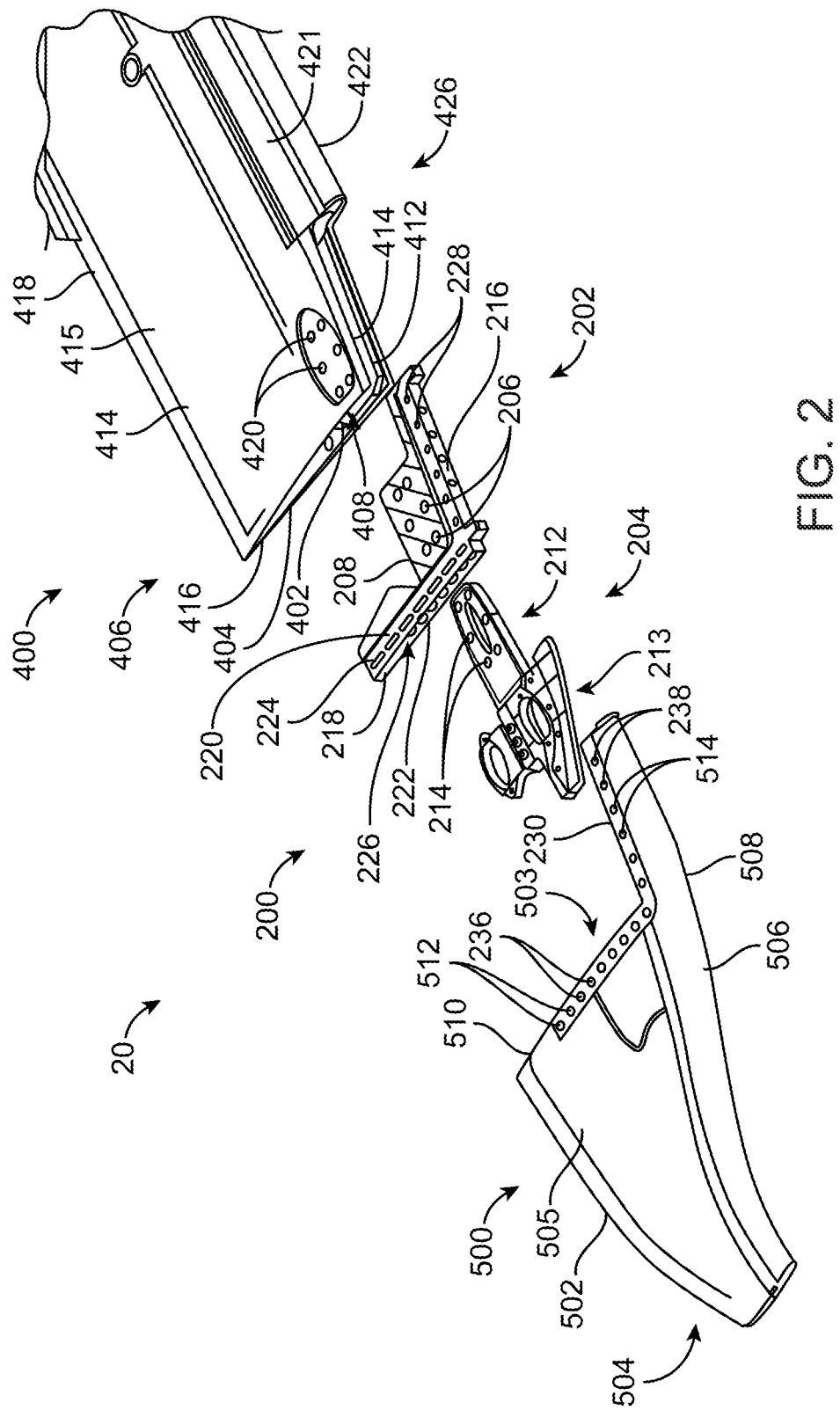
FIG. 2 is a partially exploded perspective view of a portion of rotor blade including a tip rib and a tip block, according to some embodiments.

Referring to FIG. 2 a tip end joint assembly 200 is shown in an exploded view, in accordance with an exemplary embodiment. The tip end joint assembly 200 is configured to join the main blade body 400 of the rotor blade 20 to the blade tip 500 of the rotor blade 20 at the outboard end of the rotor blade 20. The main blade body 400 includes a main structural spar 402 that extends from the inboard end (not shown) of the main blade body 400 to the outboard tip 404 of the outboard end 406 the main blade body 400. The spar 402 may include a substantially elliptical (e.g., ovoid, oval, etc.) cross section surrounding an internal spar cavity 408 for a majority of the spar 402. In particular, the spar 402 may have a substantially elliptical cross-section, except near the outboard end 406 of the spar 402 where the spar includes a cutout 426 at its leading edge. The main blade body 400 may also include an upper blade skin 414 and a lower blade skin 416 coupled respectively to the upper portion 410 and lower portion 412 of the spar 402 and extending toward the trailing edge 418 of the main blade body 400, where the blade skins 414, 416 meet. The main blade body 400 may also include a leading edge cover 421 defining the leading edge 422 of the main blade body 400. The spar 402 may further include a plurality of openings 420 configured to receive fasteners for mounting the tip rib 202 and tip block 204 to the spar 402. The spanwise portion 216 of the tip rib 202 can extend in the leading edge direction.

The blade tip 500 includes an upper tip skin 502 and a lower tip skin 504 (on reverse side as shown), as well as a leading edge cover 506 defining the leading edge 508 of the blade tip 500. The leading edge cover 506 may extend beyond the inboard end 510 of the tip skins 502, 504 such that when the blade tip 500 is coupled to the main blade body 400, the leading edge cover 506 covers the cutout 426 in the spar 402 and forms a contiguous aerodynamic surface with the leading edge cover 421 of the main blade body 400. The blade tip 500 includes an internal tip cavity 503 between the upper and lower tip skins 502, 504 and the leading edge cover 506.

The tip rib 202 can be used to couple the blade tip 500 to the spar 402. The tip rib 202 includes a mounting bracket 208 that can be inserted into the internal spar cavity 408. The mounting bracket 208 includes openings 206 that align with the openings 420 in the spar 402, such that fasteners can be inserted through the openings 206 and the openings 420 to join the main blade body 400 to the tip rib 202. The mounting bracket 208 may have a height that is approximately equal to the height of the internal spar cavity 408, such that when the lower surface of the mounting bracket 208 contacts the lower inner surface of the spar 402, the upper surface of the mounting bracket 208 contacts or nearly contacts the upper inner surface of the spar 402. In some embodiments, the mounting bracket 208 may be solid, while in other embodiments, the mounting bracket 208 may be "hollow," with an upper portion, a lower portion, and a gap therebetween. If the mounting bracket 208 includes a gap, an inboard portion 212 of the tip block 204 can be inserted into and fill the gap and be fastened to the tip rib 202 and the spar 402 via the openings 214. The openings 214 align with the openings 206 and the openings 420 such that fasteners can be inserted through all of the openings 206, 214, 420 to join the spar 402 to the tip rib 202 and the tip block 204. When the inboard portion 212 of the tip block 204 is coupled to the spar 402 and the tip rib 202, an outboard portion 213 of the tip block 204 extends beyond the outboard tip 404 of the main blade body 400. The outboard portion 213 may be referred to as a cantilevered portion. When the blade tip 500 is coupled to the main blade body 400, the outboard portion 213 of the tip block extends into the internal tip cavity 503 of the blade tip 500. The cantilevered portion 213 of the tip block 204 may extend into the internal tip cavity 503 with sufficient clearance to not contact or hit the inside surface of the tip skins 502, 504 during operation and without directly contacting the blade tip 500 itself, thus isolating the aerodynamic forces on the blade tip from the centripetal and blade bending forces caused by the tip block 204. In embodiments in which the mounting bracket 208 is solid, the autorotative weights can be installed using a different mounting arrangement or can be installed elsewhere on the blade 20.

The tip rib 202 may include a spanwise tip mount portion 216 and a chordwise tip mount portion 218 that form an L shape to match the corner of the blade skins 414, 416 where the leading edges of the blade skins 414, 416 meet the outboard edges of the blade skins 414, 416. The chordwise tip mount portion 218 includes an upper flange 220 configured to be coupled to the upper tip skin 502 and a lower flange 222 configured to be coupled to the lower tip skin 504. The shape of the chordwise tip mount portion 218 substantially matches the shape of the internal tip cavity 503 of the blade tip 500 at its inboard end. The upper flange 220 and the lower flange 222 each include openings 224 configured to align with corresponding openings 512 in tip skins 502, 504. Fasteners can be inserted into the openings 224 to couple the tip rib 202 to the blade tip 500. The fasteners can extend into a gap 226 between the upper flange 220 and the lower flange 222 of the chordwise tip mount portion 218. The gap 226 also allow the inboard portion 212 of the tip block 204 to be inserted into the gap between the upper and lower portions of the mounting bracket 208. The spanwise tip mount portion 216 similarly includes openings 228 configured to align with corresponding openings 514 in the leading edge cover 506 of the blade tip 500.

In some embodiments, the openings 228 may be threaded holes such that a fastener can be inserted into through holes in the leading edge cover 506 threaded into the openings 228. A similar set of openings 228 may be positioned on the lower side of spanwise tip mount portion 216 (not shown) to couple the lower portion of the leading edge cover 506 to the tip rib 202. In some embodiments, the threaded holes may extend through the entire spanwise tip mount portion 216 such that fasteners can be inserted from both the top and bottom. In these embodiments, the fasteners must be short enough so as to not contact each other within the hole. In other embodiments, the openings 228 in the upper side of the spanwise tip mount portion 216 may be offset from the openings in the lower side of the spanwise tip mount portion 216. A doubler (e.g., a doubler plate) 230 may be included to strengthen the connection between the blade tip 500 and the leading edge cover. This connection is described in further detail below. It should be understood that the pattern of openings 236, 238 shown in the doubler 230 shown in FIG. 2 matches the pattern of the openings 512, 514 in the blade tip 500.

Referring now to FIGS. 3A-3D, the connection of the blade tip 500 to the main blade body 400 is shown, according to some embodiments. To depict the connection more clearly, the lower half of the blade tip 500 and the leading edge of the blade 20 are not shown in FIG. 3A. However, it should be understood that the fully assembled blade tip 500 can be slid over the chordwise tip mount portion 218 of the tip rib 202 from the outboard end such that the upper tip skin 502 contacts or nearly contacts the upper flange 220 of the chordwise tip mount portion 218 and the lower tip skin 504 contacts or nearly contacts (so as to be proximate to) the lower flange 222 of the chordwise tip mount portion 218. For example, the upper and lower tip skins 502, 504 may be integrally formed as a single part or may otherwise may be inseparable once the blade tip 500 is assembled. As described above with reference to FIG. 2, the mounting bracket 208 of the tip rib 202 is coupled to the spar 402. The chordwise tip mount portion 218 of the tip rib 202 extends beyond the outboard tip 404 of the main blade body 400 in the outboard direction. The inboard end of the blade tip 500 slides over the chordwise tip mount portion 218, such that the openings 512 in the upper tip skin 502 are positioned over and aligned with the openings 224 in the chordwise tip mount portion 218. The inboard end 516 of the upper tip skin 502 includes a recessed portion 518 where the upper tip skin 502 contacts the doubler 230. When the doubler 230 and upper tip skin 502 are coupled to the tip rib 202, the upper surface 505 of the upper tip skin 502, the upper surface 232 of the doubler 230, and the upper surface 415 of the upper blade skin 414 form a substantially contiguous airfoil surface, such that the upper surface 232 of the doubler 230 is substantially flush with the upper surfaces 505, 415 of the upper tip skin 502 and the upper blade skin 414.

Once the upper blade skin 414 and doubler 230 are positioned above the chordwise tip mount portion 218, the fasteners 234 (e.g., bolts, screws, etc.) may be inserted in the openings 236, 224, 512. The tip rib 202 may include fastener receivers 240 (e.g., nuts, etc.) positioned around the openings 236 in the gap 226 between the upper flange 220 and the lower flange 222 of the chordwise tip mount portion 218. Each fastener receiver 240 may include two mounting flanges 242 that can be coupled to mounting holes 244 in the upper and lower flanges 220, 222 with fasteners 248 (e.g., screws, rivets, etc.). The fastener receivers 240 include openings 246 configured to receive the fasteners 234. For example, the fasteners 234 may be threaded bolts and the openings 246 may be threaded holes. The mounting holes 244 are positioned such that, when the mounting flanges 242 are coupled to the mounting holes 244, the openings 246 are aligned with the openings 236. The openings 236, 224, 512 may all be through holes such that threaded fasteners 234 pass through the openings 236, 224, 512 and can be threaded into the threaded openings 246 in the fastener receivers 240. The openings 236 in the doubler 230 may be countersink or counterbored such that the fasteners 234 do not extend above the upper surface 232 of the doubler 230 or are substantially flush with the upper surface of the doubler 230 to avoid disrupting the air flow over the blade tip 500.

Figure 3A:
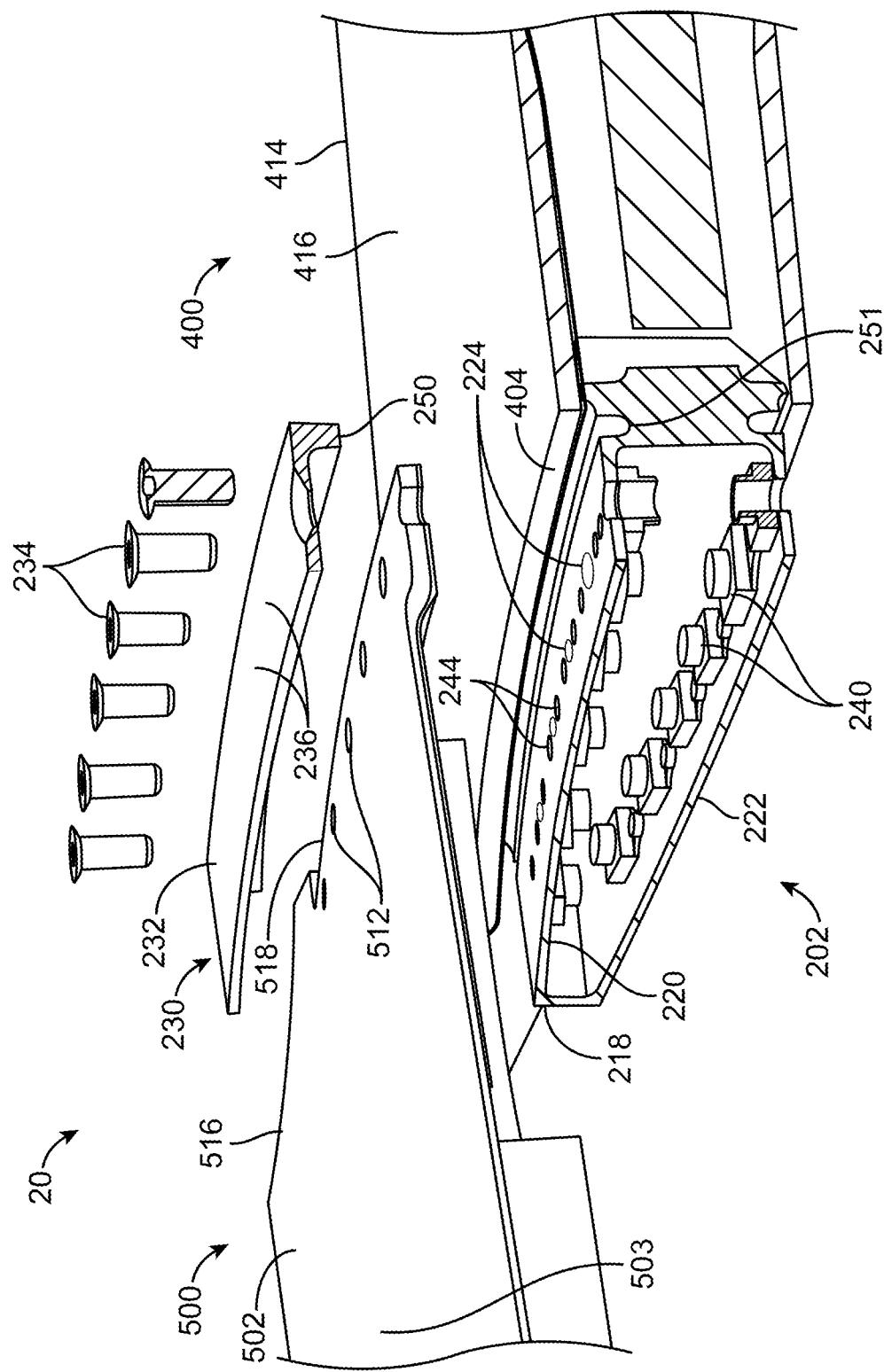
FIG. 3A is a partially exploded perspective view of a portion of the rotor blade of FIG. 2.
Figure 3B:
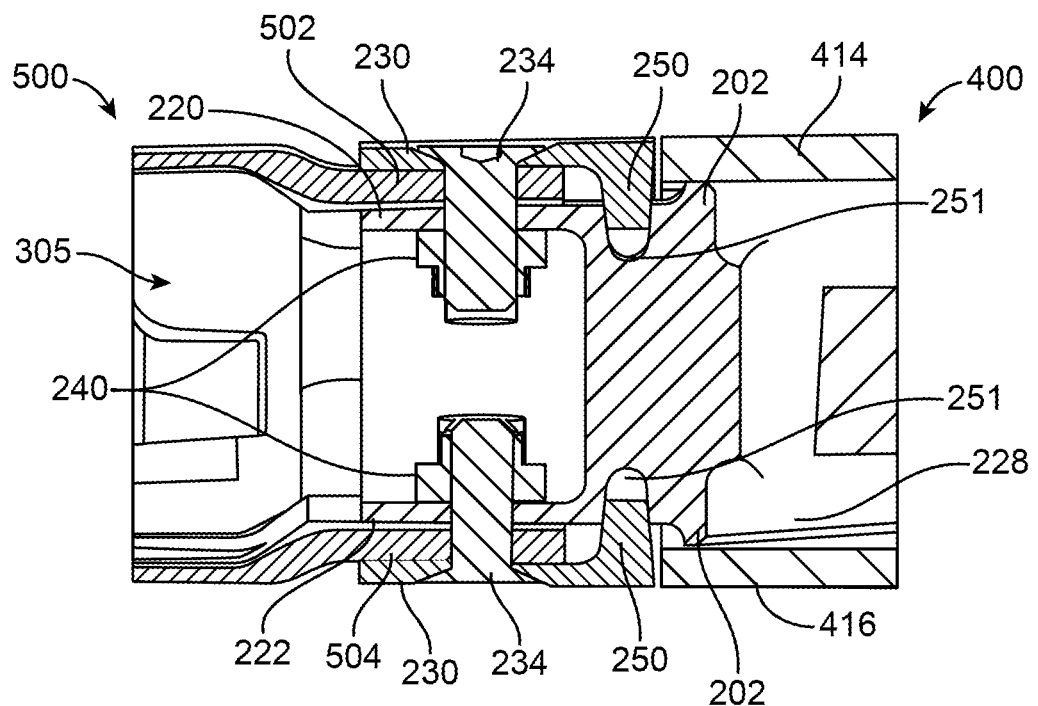
FIG. 3B is a spanwise section view of a portion of the rotor blade of FIG. 2.
Figure 3C:
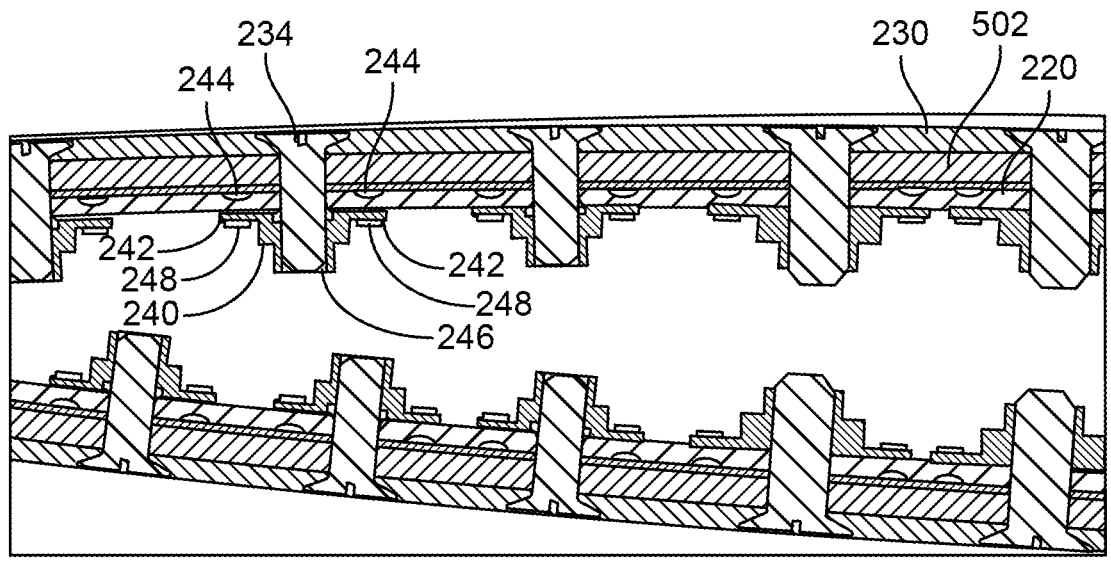
FIG. 3C is a chordwise section view of a portion of the rotor blade of FIG. 2.
Figure 3D:
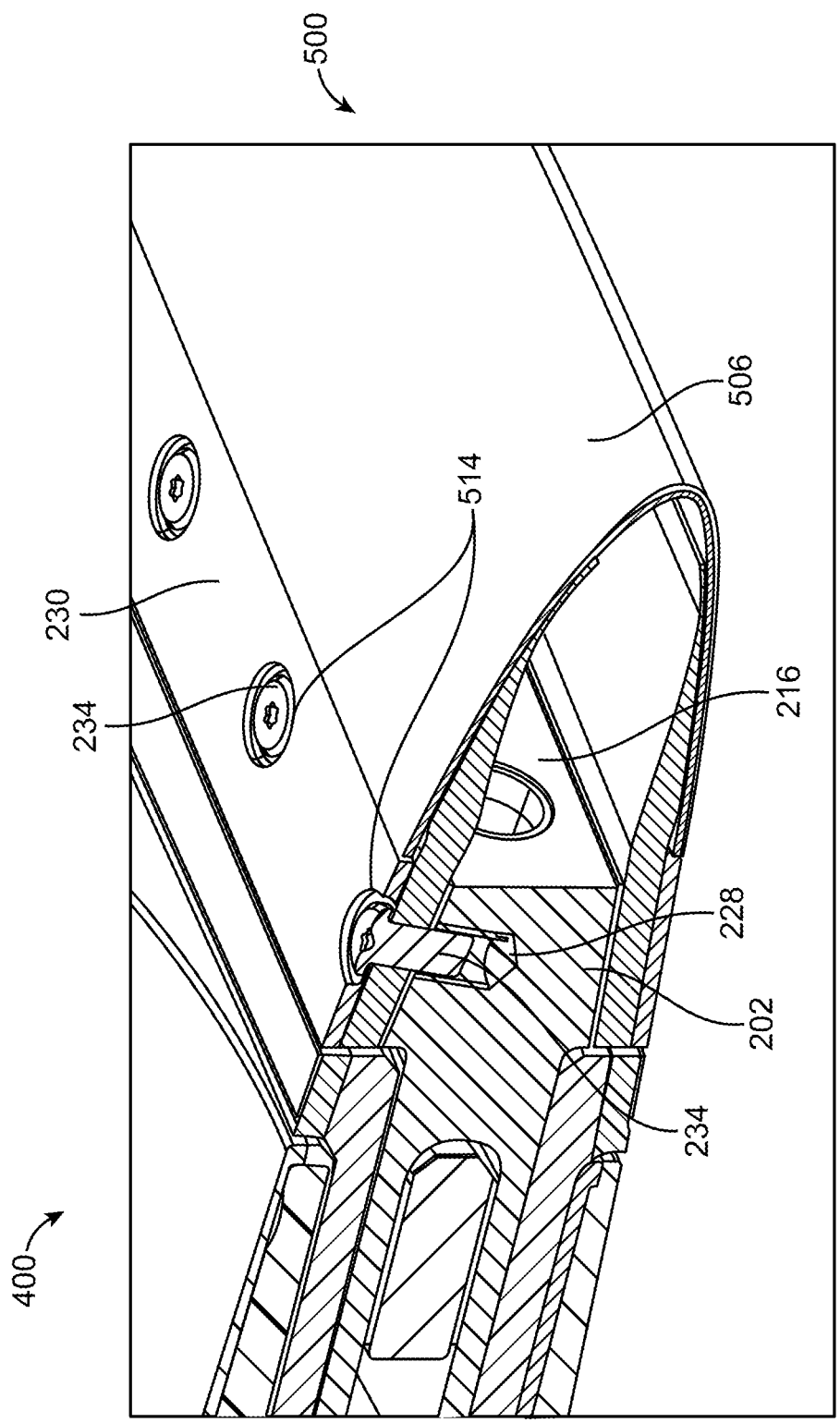
FIG. 3D is a chordwise section view of a portion of the rotor blade of FIG. 2.

Referring now to FIG. 3B, a spanwise section cut of the connection of the blade tip 500 to the main blade body 400 is shown, according to some embodiments. Each doubler 230 (e.g., the upper doubler 230 and the lower doubler 230) includes a flange 250 that fits into a slot 251 in the tip rib 202. When the rotor blade 20 rotates about the rotor hub assembly H, a significant amount of centripetal force is required to keep the blade tip 500 coupled to the main blade body 400. Removable blade tips are typically attached with a simple lap joint in single shear. The flange 250 allows the doubler 230 to provide additional centripetal force to retain the upper blade skin 414, cooperatively in double shear with the flange 220 (and the lower blade skin 416 in double shear with the flange 222). Without the flange 250, the doubler 230 does not provide centripetal force because the doubler 230 is uncoupled from the main blade body 400 or the tip rib 202. Additionally, because the countersink or counterbore for the fasteners 234 are in the doubler 230, no counterbore or countersink is required in the tip skins 502, 504 themselves. This can reduce stress concentrations in the tip skins 502, 504 and allows for the use of smaller fasteners 234 and/or greater component longevity. FIG. 3C shows a chordwise section cut of the connection of the blade tip 500 to the main blade body 400, according to some embodiments. The fastener receivers 240 are shown in further detail. FIG. 3D shows a chordwise section cut of the connection of the blade tip 500 to the main blade body 400 at the leading edge, according to some embodiments. The connection of the leading edge cover 506 to the spanwise tip mount portion 216 is shown in further detail. As can be seen in FIG. 3D, the spanwise tip mount portion 216 may be solid from its upper surface to its lower surface, with the openings 228 being threaded or including threaded inserts. Further, because loads may be lower in the chordwise direction, the flange 230 may be omitted from the doubler 230 in the spanwise tip mount portion 216. In some embodiments, the spanwise tip mount portion 216 may be arranged similarly to the chordwise tip mount portion 218, with an upper flange, a lower flange, and a gap therebetween allowing for the use of nuts or nutplates on the inner surfaces of the flanges. In some embodiments, the chordwise tip mount portion 218 may be solid with threaded holes or holes with threaded inserts, similar to the spanwise tip mount portion 216 shown in FIG. 3D, or may be solid in the aft portion only, while being "hollow" in the forward portion in order to receive the inboard portion 212 of the tip block 204.

Adjustable Weight

Figure 4A:
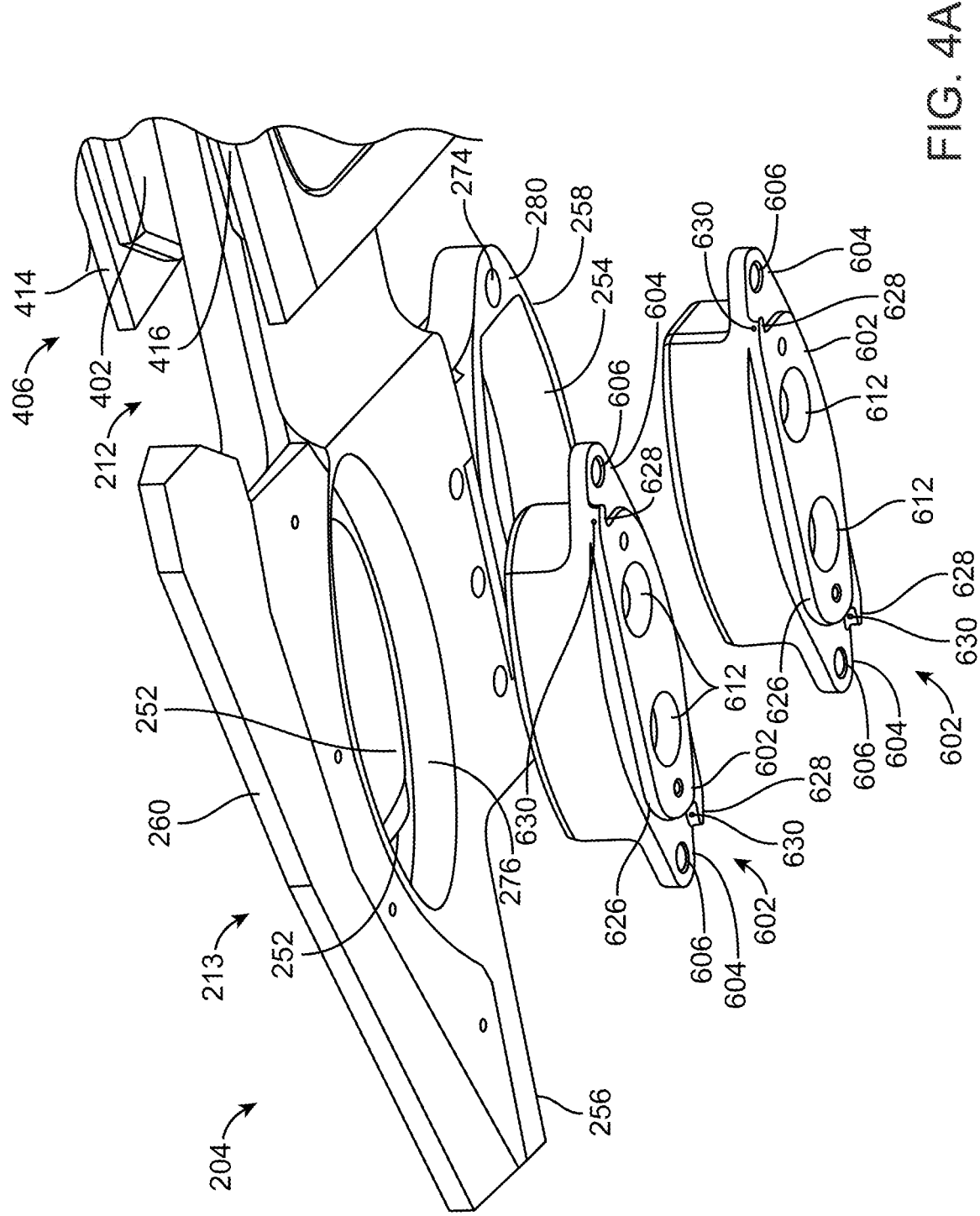
FIG. 4A is a perspective view of a portion of the tip block of FIG. 2.
Figure 4B:
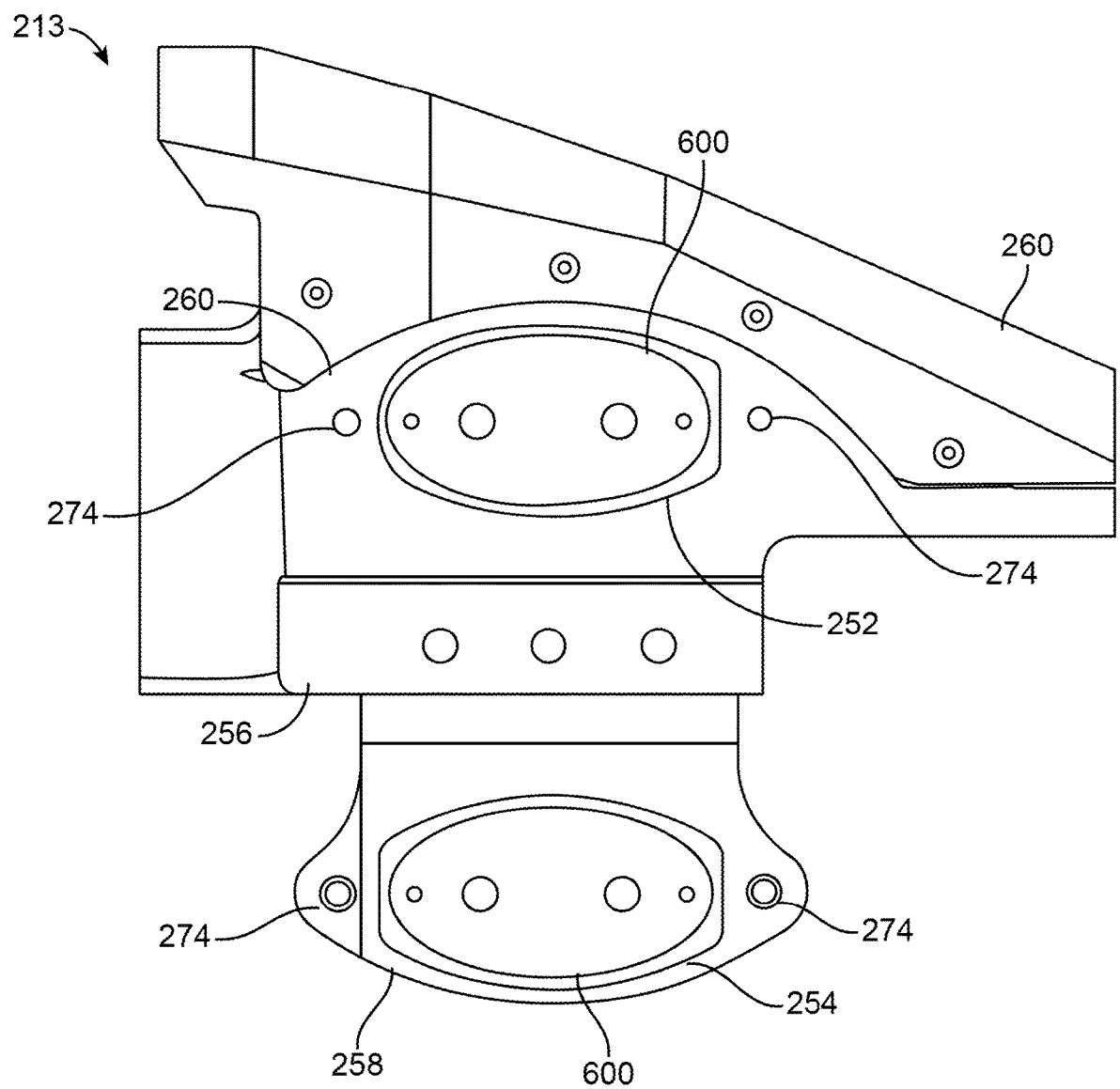
FIG. 4B is a top view of a portion of the tip block of FIG. 2.
Figure 4C:
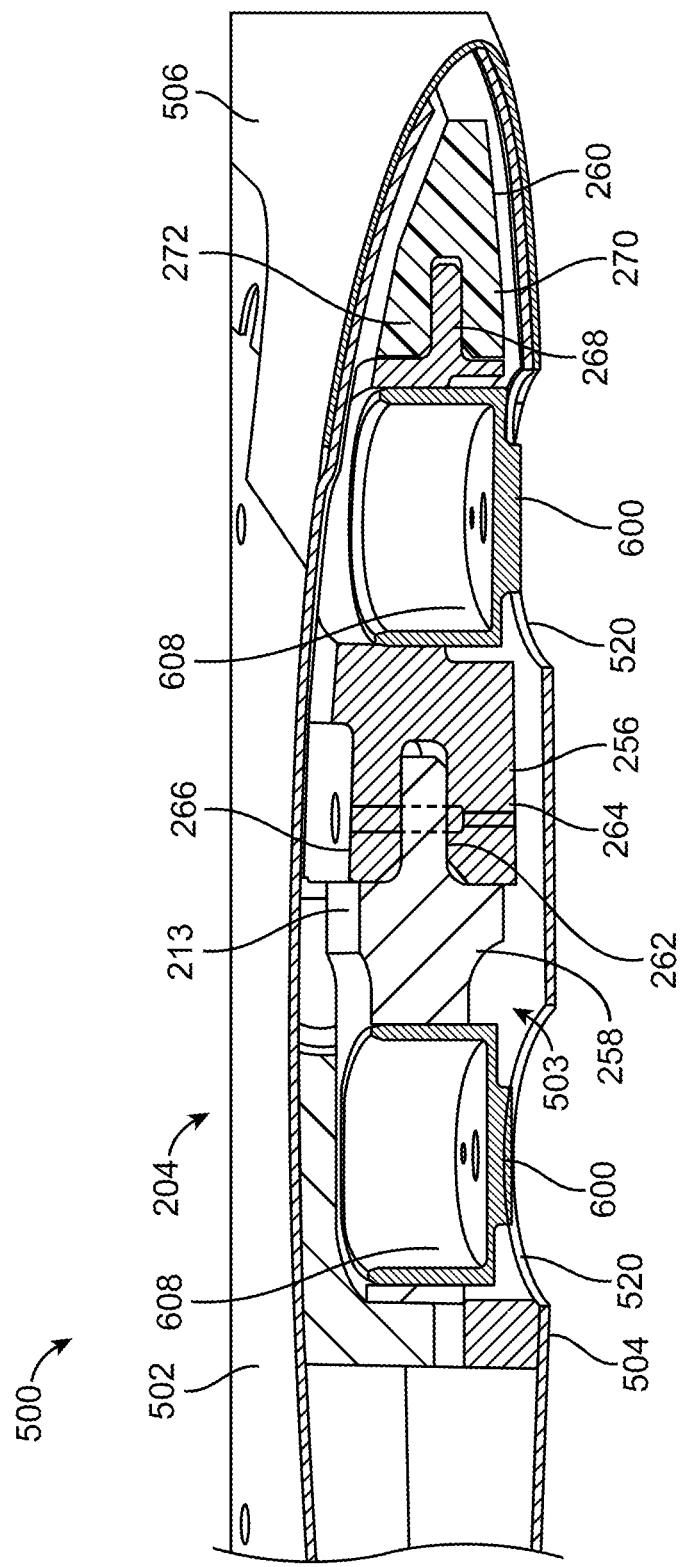
FIG. 4C is a chordwise section view of a portion of the tip block of FIG. 2.

FIGS. 4A, 4B, and 4C respectively show a bottom perspective view, a top view, and a chordwise section view of the tip block 204 and the associated configurable weight cartridges 600, according to some embodiments. In some embodiments, the configurable weight cartridges 600 may be referred to as components of the tip block 204. As described above with reference to FIG. 2, the inboard portion 212 of the tip block 204 is coupled to the spar 402 at the outboard end 406 of the main blade body 400. The outboard portion 213 of the tip block 204 extends beyond the outboard tip 404 of the main blade body 400. The tip block 204 may include a first weight cup cavity 252 and a second weight cup cavity 254. The weight cup cavities 252, 254 may be configured to receive the configurable weight cartridges 600. One or more weights 610 may be received within and coupled to the configurable weight cartridges 300 as needed to adjust the balance of the rotor blade 20. In some embodiments, the tip block 204 may be integrally formed from a single piece of material, or multiple components made of the same or different materials. In some embodiments, the tip block 204 may be formed from multiple components fastened together using fasteners (e.g., bolts, screws, rivets, pins, etc.). For example, as shown FIGS. 4A-4B, a primary member 256 of the tip block 204 may include the inboard portion 212 and the first weight cup cavity 252. A second member 258 may be coupled to the trailing edge side of the primary member 256 and may include the second weight cup cavity 254. A third member 260 may be coupled to the leading edge side of the primary member 256 to add additional, non-configurable weight for autorotation. In some embodiments, as shown in FIG. 4C, the second member 258 may include a first flange 262 at its leading edge that is inserted in between a second and third flange 264, 266 at the trailing edge of the primary member 256 and coupled in double shear. Similarly, the primary member 256 may include fourth flange 268 at its leading edge that is inserted between a fifth and sixth flange 270, 272 of the third member 260 and coupled in double shear. In some embodiments, the configurable weight cartridges 600 may not be used, and weights 610 may be installed directly into the weight cup cavities 252, 254. For example, the weight cup cavities 252, 254 may include threaded holes, and fasteners may be inserted into through holes in the weights 610 and coupled to the threaded holes. In some embodiments, the second member 258 may be made of a less dense material than the primary member 256 and/or the third member 260. Because the second member 258 is aft of the feathering axis P, excess weight could contribute to blade instability, which is mitigated by using the less dense material. As shown in FIG. 4C and FIG. 10B, the outboard portion 213 (e.g., the cantilevered portion) of the tip block 204 may be positioned in the internal tip cavity 503 of the blade tip 500 such that there is a clearance between the outboard portion 213 and the inner surfaces of the blade skins 502, 504, and the outboard portion 213 does not contact or hit the inner surfaces of the blade skins 502, 504. The outboard portion 213 may include the weight cup cavities 252, the weight cartridges 600, the second member 258, the third member 260, and a portion of the primary member 256.

Each cartridge 600 includes a cartridge body 602 with a flange 604 at each end with an opening 606 therethrough configured to receive a fastener for coupling the cartridge 600 to the weight cup cavities 252, 254. The weight cup cavities 252, 254 include corresponding openings 274 configured to receive the fastener. For example, the fastener may be a threaded fastener such as a bolt or screw, the openings 606 may be through holes and the openings 274 may be threaded holes. The fastener may be inserted through the through holes 606 and threaded into the threaded holes 274 to couple the cartridges 600 to the weight cup cavities 252, 254. In some embodiments, the primary member 256 and/or the second member 258 may include a counterbore 276 so that the member 256, 258 can be thicker and therefore add additional autorotative weight. In some embodiments, a lower surface 278 of the first weight cup cavity 252 (which the flanges contact when the cartridge is coupled to the weight cup cavity 252) is coplanar (e.g., flush) with a lower surface 280 of the second weight cup cavity 254, such that the cartridges 600 are positioned in the same vertical location relative to the tip block 204 Similarly, in some embodiments, the weight cup cavities 252, 254 may be positioned the same distance in the spanwise direction from the inboard portion 212. For example, referring to FIG. 4B, with the inboard portion 212 of the tip block 204 extending horizontally, the cartridges 600 are positioned at the same horizontal location.

Figure 5:
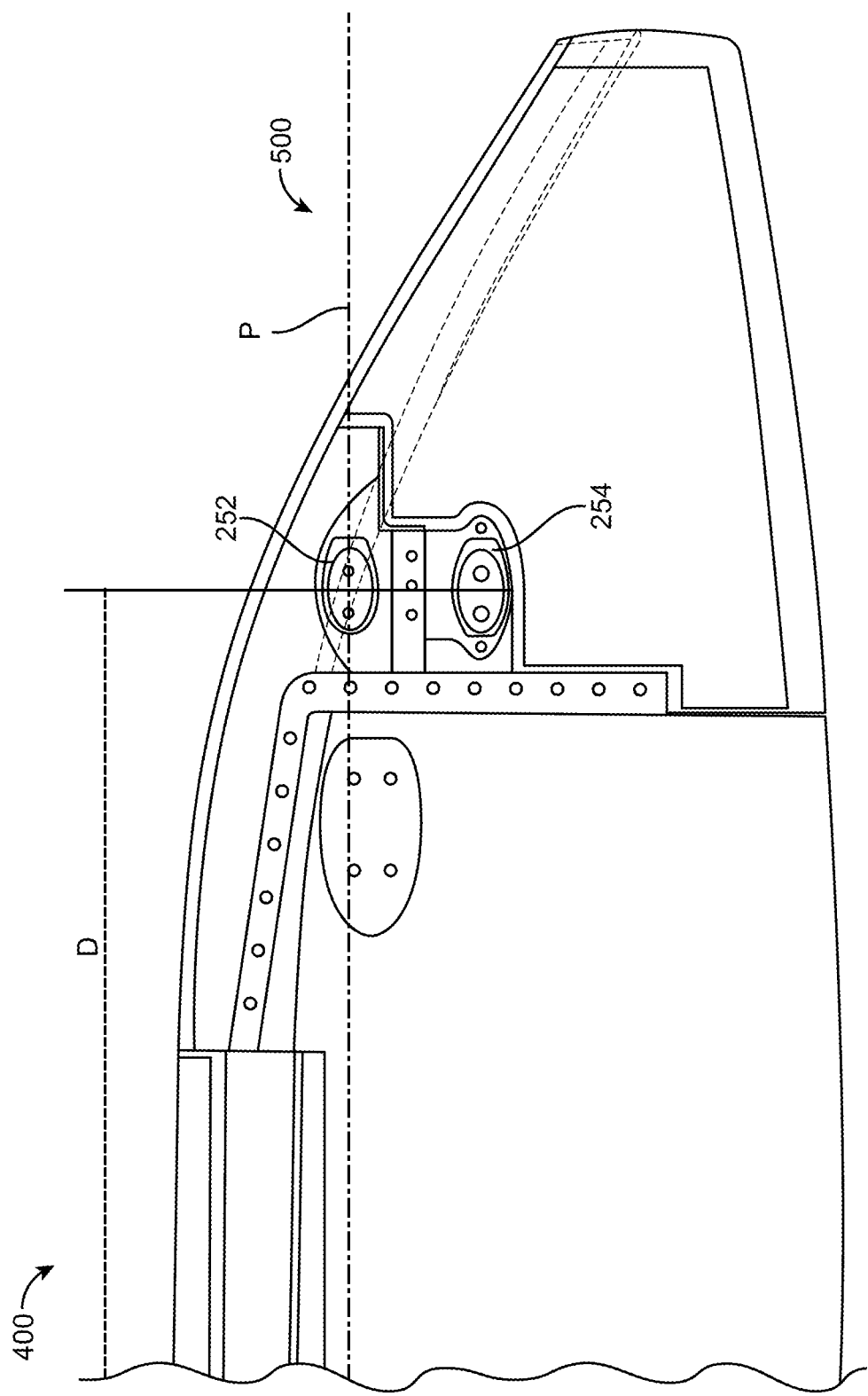
FIG. 5 is a top view of a portion of the rotor blade of FIG. 2.
Figure 6:
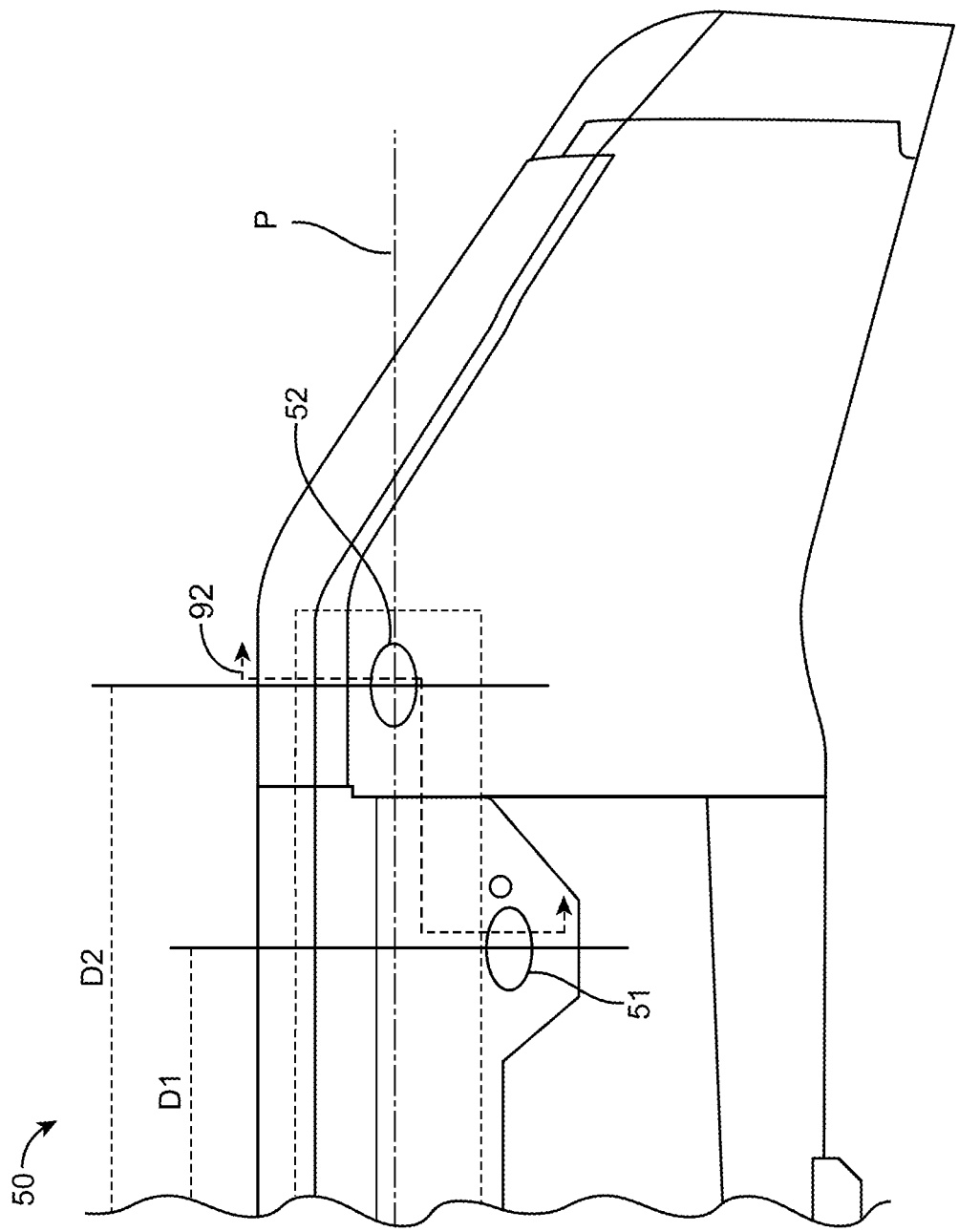
FIG. 6 is a top view of a prior art rotor blade.

Referring now to FIG. 5, the rotor blade 20 is shown, according to some embodiments. The tip block may be positioned such that the cartridges 600 are the same spanwise distance D from the root end of the main blade body along the feathering axis P (e.g., the same radial station). For example, the cartridges 600 may each be positioned at the same radial station of the rotor blade 20. FIG. 6 shows a prior art rotor blade 50 with a balance weight arrangement in which a first weight stack 51 is positioned at a first spanwise distance D1 from the root end of the rotor blade 50 (e.g., a first radial station) and a second weight stack 52 positioned at a second spanwise distance D2 from the root end (e.g., a second radial station), aligned with the feathering axis P. In the prior art arrangement, adding weight to one of the weight stacks 51, 52 to adjust the chordwise balance of the rotor blade 20 also affects the spanwise balance of the rotor blade. Similarly, adding weight to one of the weight stacks 51, 52 to adjust the spanwise balance of the rotor blade 20 can also affect the chordwise balance of the rotor blade. In at least one embodiment, positioning the two cartridges 600 at the same radial station on the rotor blade 20 simplifies the rotor blade balancing process. For example, the first weight cup cavity 252 may be substantially positioned on the feathering axis P. The weight added to the first weight cup cavity 252 may therefore impact the spanwise balance of the blade 20 while having no impact or substantially no impact on the chordwise balance of the blade 20. The second weight cup cavity 254 may be positioned off of the feathering axis P, and weight added to the second weight cup cavity 254 can be used to adjust the chordwise balance.

Figure 7:
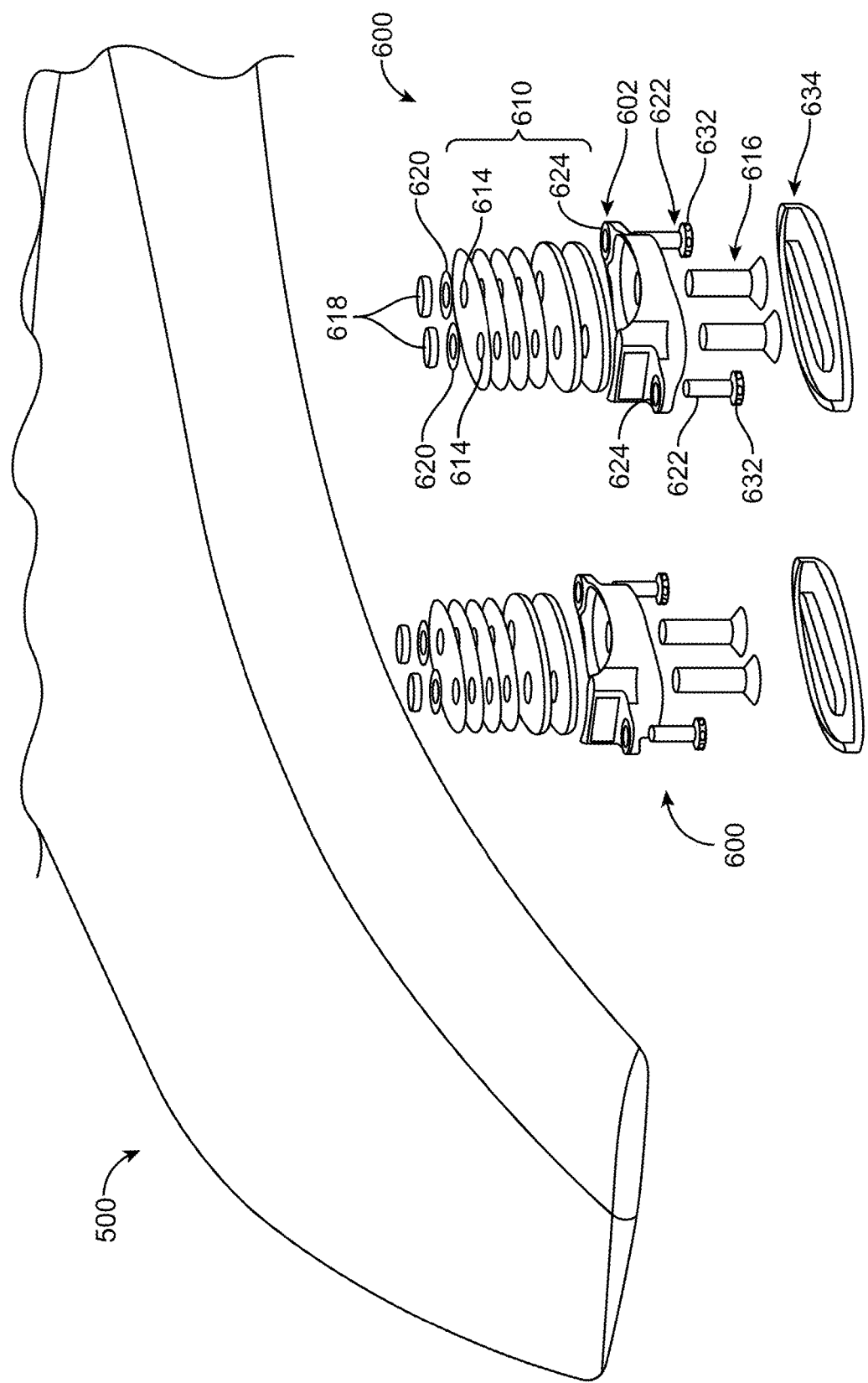
FIG. 7 is a partially exploded perspective view of configurable weight cartridges, according to some embodiments.
Figure 8:
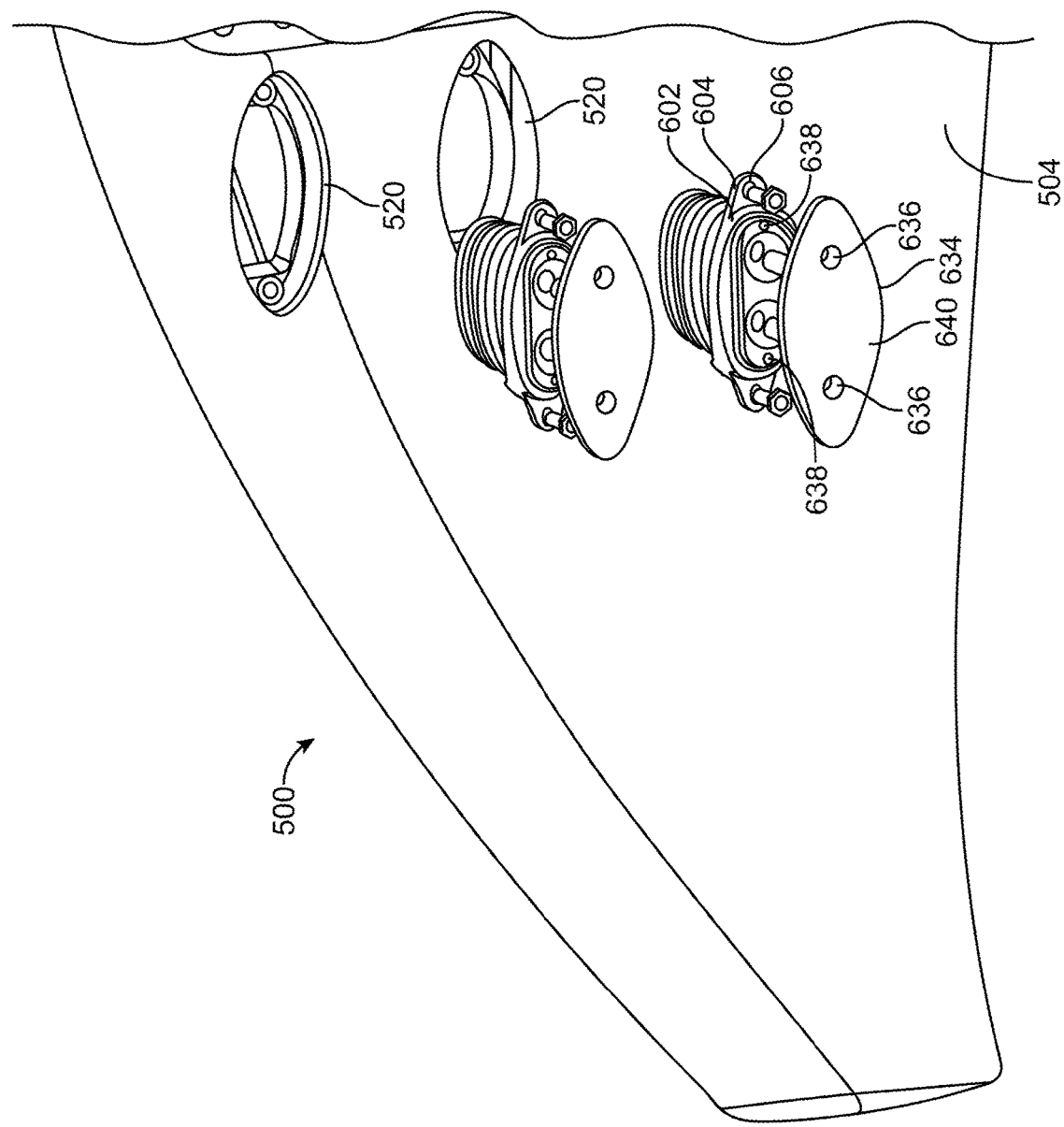
FIG. 8 is a partially exploded perspective view of the configurable weight cartridges of FIG. 7.

Referring now to FIGS. 7 and 8, the two weight cartridges 600 are shown in further detail. Each cartridge 600 includes a cartridge body 602 including a cup 608 into which one or more weights 610 can be inserted. The weights 610 may be thin plates shaped to fit into the cup 608. The mass density and thickness of the weights can vary to allow for fine adjustment of the total weight of the cartridge 600. The cartridge body 602 may include weight fastener holes 612 that align with corresponding holes 614 in the weights 610. As shown in FIG. 4A, the weight fastener holes 612 may be countersunk. Weight fasteners 616 (e.g., bolts, screws, pins etc.) can be inserted into the weight fastener holes 612 and corresponding holes 614 to removably couple the weights 610 to the cartridge body 602. The weight fasteners 616 may be coupled to fastener receivers 618 (e.g., nuts, locknuts, cotter pins, etc.) to secure the weights 610 to the cartridge body 602. The cartridge 600 may include washers 620 between the fastener receivers 618 and the weights 610. Once the weights 610 are secured to the cartridge body 602, the cartridge 600 can be coupled to the tip block 204. Thus, the cartridge 600 can be installed in and removed from the weight cup cavities 252, 254 without decoupling the weights 610 from the cartridge 600. This may allow the weight of the cartridges to be adjusted away from the rotor blade 20 and more easily installed into the weight cup cavities 252, 254.

The blade tip 500 may include openings 520 in the lower tip skin 504 positioned below the weight cup cavities 252, 254 of the tip block 204 and shaped to receive the cartridges 600. The cartridges 600 can be inserted through the openings 520 into the weight cup cavities 252, 254. The cartridge fasteners 622 can then be inserted through the openings 606 and fastened to the openings 274 in the tip block 204. In some embodiments, washers 624 may be positioned between the flanges 604 of the cartridge bodies 602 and the tip block 204. In some embodiments, the weight cup cavities 252, 254 of the tip block 204 may be configured to receive the cartridges 600 from above, rather from below, and the openings 520 in the blade tip 500 may be in the upper tip skin 502 rather than the lower tip skin 504. In some embodiments, rather than using a stack of weights 610, a collection of different cartridge bodies 602 may be provided with different weights. Rather than including a cup 608, the cartridge bodies 602 may have solid portions of varying heights so that each cartridge body is a different weight. Rather than replacing the weights 610 to adjust the rotor blade balance, the cartridge body 602 itself can be replaced by a heavier or lighter cartridge body.

As shown in FIG. 4A, the cartridge body 602 may include a raised portion 626 forming a small flange 628 near each flange 604. While optional, the shown small flange 628 includes a safety wire hole 630. The heads of the cartridge fasteners 622 may also include safety wire holes 632. Once the cartridges are fastened to the tip block 204, safety wire may be inserted through each safety wire hole 630 in the small flange 628 and the safety wire hole 632 in the corresponding cartridge fastener 622. The ends of the safety wire may then be twisted to secure the cartridge fastener 622 to the cartridge body 602 to reduce or prevent the cartridge fasteners 622 from rotating and loosening due to aircraft vibration, so that the cartridge 600 remains coupled to the tip block 204. After the cartridges 600 are coupled to the tip block 204, cover plates 634 in the shape of the openings 520 can be installed to cover the openings 520.

In some embodiments, the cover plate 634 seal the opening 520 entirely, while in other embodiments, there may be some clearance between the cover plates 634 and the tip skins 502, 504 so that the blade tip 500 remains isolated from the tip block 204. The cover plates 634 may include holes 636 that align with holes 638 in the cartridge body 602. A threaded fastener (e.g., a bolt, a screw, etc.) can be inserted through the holes 636 in the cover plates 634 and threaded into the holes 638 in the cartridge body 602 to couple the cover plate 634 to the cartridge body 602. When the cartridge 600 and cover plate 634 are installed, the outer surface 640 of the cover plate 634 may form a substantially contiguous airfoil surface with the outer surface of the lower tip skin 504. The holes 636 may be countersunk such that the fastener heads do not extend beyond the outer surface 640 or are substantially coplanar (e.g., flush) with the outer surface 640. In some embodiments, the weight cup cavities 252, 254 may open to the upper side of the tip block 204, and the openings 520 may be in the upper tip skin 502 rather than the lower tip skin 504.

Figure 9:
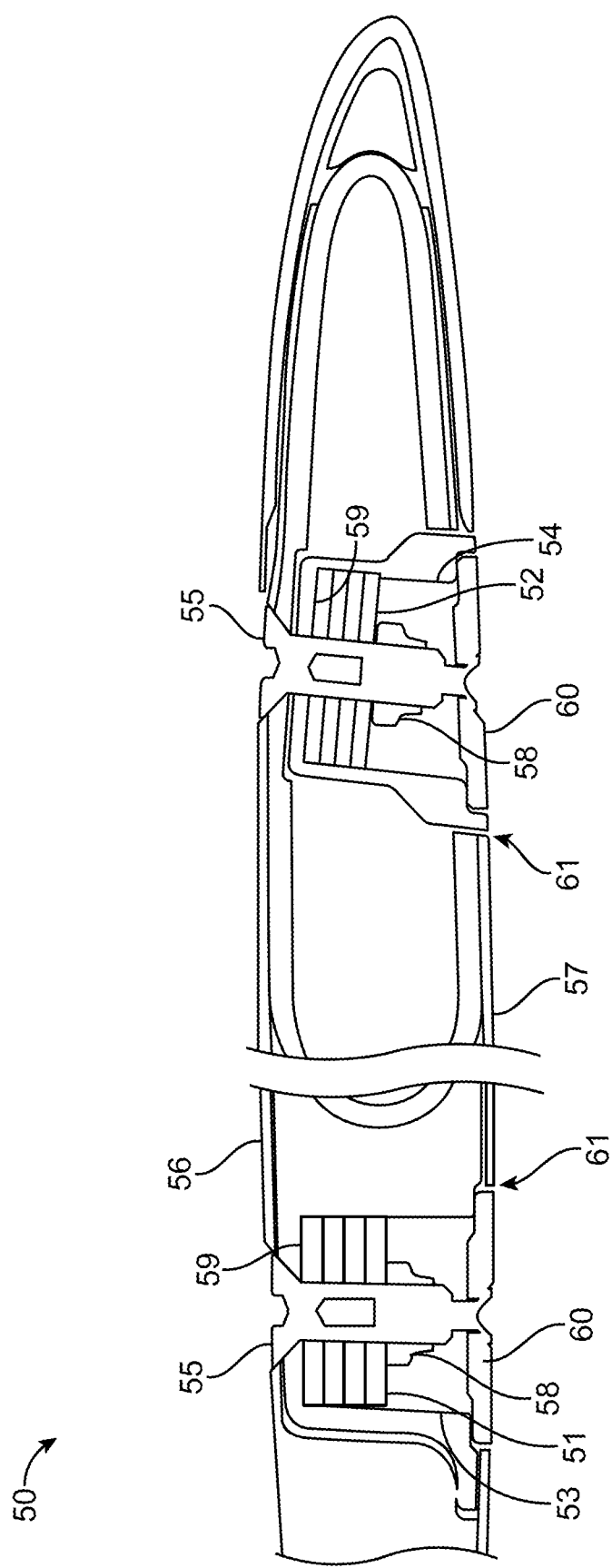
FIG. 9 is a section view of the prior art rotor blade of FIG. 6.

FIG. 9 shows a chordwise section cut along the broken section line 92 (shown in FIG. 6) of the prior art rotor blade 50. The weight stacks 51, 52 are inserted into cups 53, 54, which each include a fastener 55 inserted through the upper surface 56 of the rotor blade 50. The weight stacks 51, 52 are inserted into the cups 53, 54 through the lower surface 57 of the rotor blade 50. Each opening in the airfoil surfaces creates interference with the air flow over the rotor blade, so it is desirable to reduce the number of openings and cutouts in the aerodynamic surfaces of the blade. The weights in the weight stacks 51, 52 include holes such that the fastener can extend through the holes when the weight stacks 51, 52 are inserted into the cups 53, 54. A nut 58 is threaded onto to each fastener 55 below the weight stacks 51, 52 and tightened until the weight stacks 51, 52 are tightly secured between the nut and the upper surfaces 59 of the cups 53, 54. Cover plates 60 are then installed to cover the lower openings 61 in the rotor blade. In some cases, multiple technicians may be needed to adjust and install the weight stacks 51, 52. In at least one embodiment according to the present disclosure, the weights 610 may be secured to the cartridge body 602 on a workbench, so that a collection of loose weights does not need to be taken to the aircraft 10 to balance the rotor blades 20. Further, in the embodiments described herein, the cartridges 600 can be installed from one side of the rotor blade 20 (e.g., the lower surface) with no interference of the aerodynamic surface on the other side. For example, the blade tip 500 may have an opening on the lower tip skin 504, but does not require any opening on the upper tip skin 502. The cartridges 600 can also be installed by a single technician.

Aerodynamic Cover Retention System

Figure 10A:
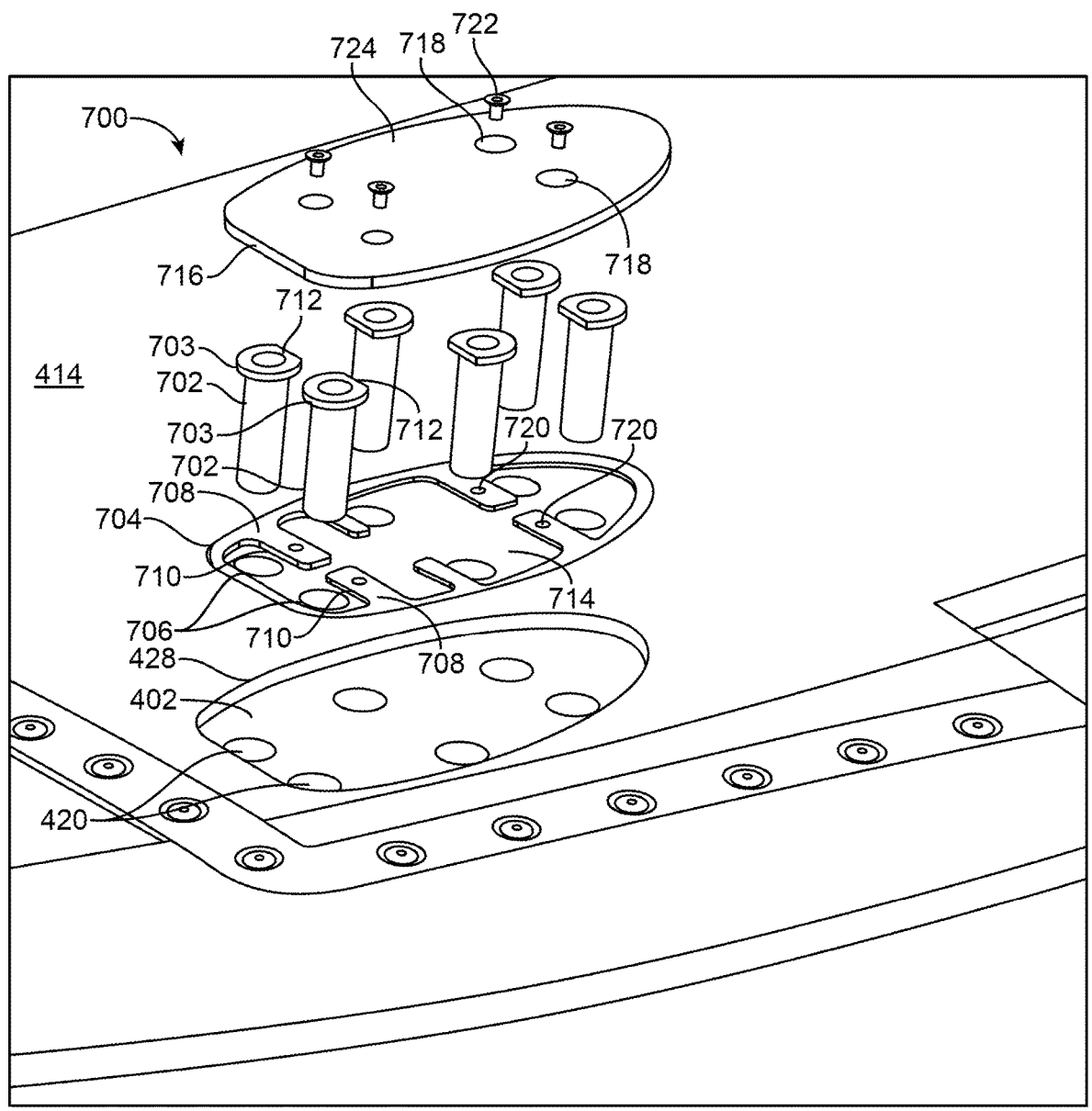
FIG. 10A is an exploded perspective view of a cover assembly for a pocket in a rotor blade skin, according to some embodiments.
Figure 10B:
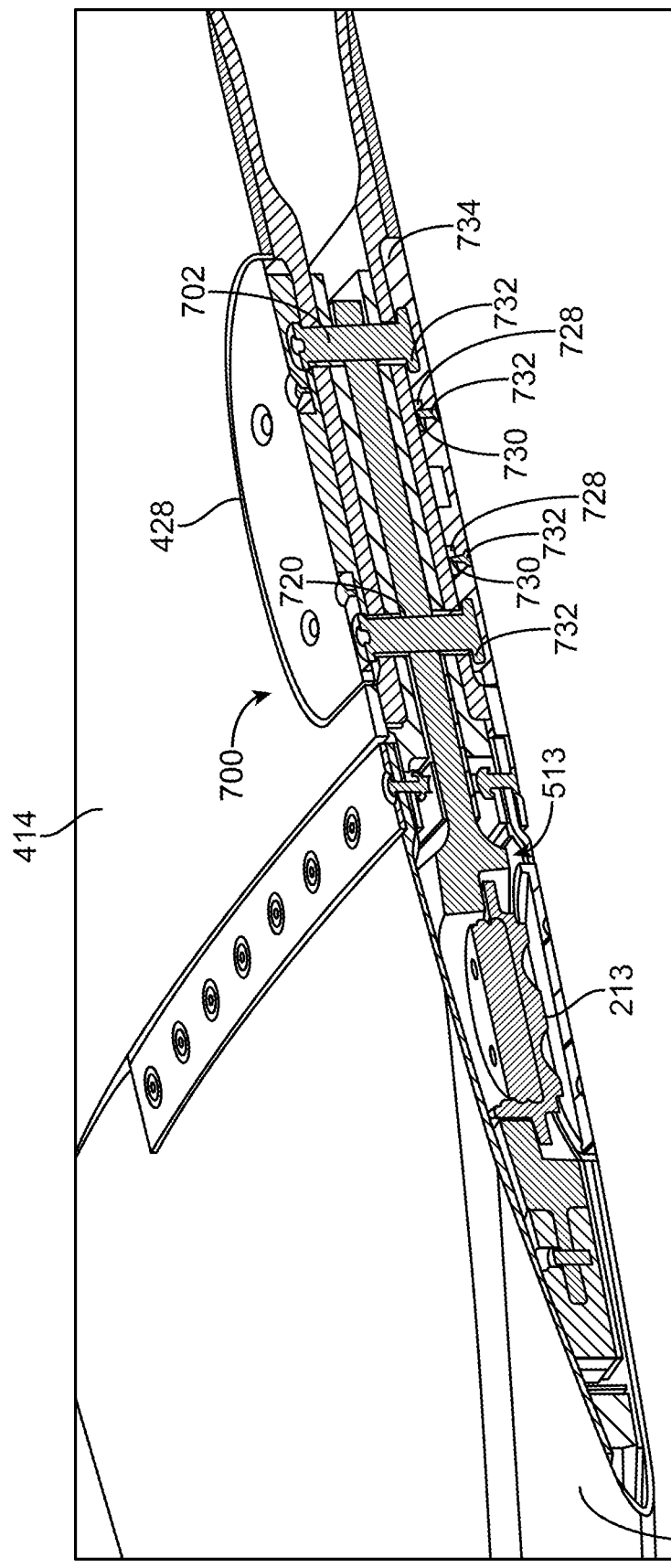
FIG. 10B is a section view of the cover assembly of FIG. 10A.

Referring now to FIGS. 10A and 10B, a cover assembly 700 for covering a pocket (e.g., an opening, etc.) in an aerodynamic surface of a rotor blade is shown, according to some embodiments. The cover assembly 700 shown in FIG. 10 may be used to cover the pocket 428 in the upper blade skin 414, which exposes an outer surface of the spar 402. Within the pocket 428, the structural fasteners 702 join the mounting bracket 208 of the tip block 204 to the spar 402. However, it should be understood that similar cover assemblies 700 may be used to cover pockets in the rotor blade 20 where structural fasteners are needed. The cover assembly includes a retention plate 704 positioned between the spar 402 and the heads 703 of the structural fasteners 702. The retention plate includes openings 706 that align with the openings 420 in the spar 402 through which the structural fasteners 702 can be inserted. One or more liner bushings may be inserted into the openings 420 to allow for a tight fit between the structural fasteners 702 and the openings 420. The retention plate 704 further includes a raised portion 708 adjacent each opening 706, each raised portion 708 with a flat side 710. The heads 703 of the structural fasteners 702 each include a corresponding flat edge 712. When the tip block 204 is being coupled to the spar 402, the retention plate 704 is inserted into the pocket 428. Then, the structural fasteners 702 are inserted into the openings 706, 420. The structural fasteners 702 are rotated such that the flat edges 712 of the fastener heads 703 are aligned with the flat sides 710 of the raised portions 708. The flat sides 710 of the raised portions 708 may be positioned a distance away from the center of the openings 706 such that the fastener heads 703 (i) contact the primary upper surface 714 of the retention plate 704 when the flat edges 712 of the fastener heads 703 are aligned with the flat sides 710 of the raised portions 708, and (ii) contact the raised portions 708 if the flat sides 710 and flat edges 712 are not aligned. Thus, when the fastener head 703 is aligned, the flat side 710 of the raised portion and contacting the primary upper surface 714, the structural fastener will not be able to rotate a substantial amount and will be unable to loosen due to aircraft vibrations. The flat sides 710 and flat edges 712 restrict rotation such that safety wire is not needed to secure the structural fasteners 702. The retention plate 704 also may act as a washer to distribute the fastener preload when the structural fasteners are tightened and to protect the spar 402 from damage. The retention plate 704 thus reduces the number of parts needed by replacing multiple washers and allowing wire or other anti-rotation mechanisms to be omitted.

The cover assembly 700 also includes a cover plate 716 configured to cover the pocket 428 and restore the aerodynamic surface of the upper blade skin 414. The cover plate 716 may include holes 718 that align with mounting holes 720 in the raised portions 708 of the retention plate 704. The holes 718 in the cover plate may be countersunk or counterbored through holes and the mounting holes 720 in the retention plate may be threaded holes. Cover fasteners 722 may be inserted through the holes 718 and threaded into the mounting holes 720 to couple the cover plate 716 to the retention plate 704. When the cover plate 716 is fastened to the retention plate 704, the cover fasteners 722 may not extend above the upper surface 724 of the cover plate 716 or may be substantially flush with the upper surface 724 to reduce disruption to the aerodynamic surface. Typically, cover plates are mounted by threading a small fastener (e.g., cover fasteners 722) into threaded holes in the center of larger structural fasteners (e.g., structural fasteners 702) or nut plates or threaded inserts must be installed in the spar. The retention plate 704 eliminates the need for these methods, which can cause stress concentrations in the structural fasteners or the spar. The cover assembly 700 can be easily removed and replaced if necessary without requiring rework of the spar 402 or upper blade skin 414.

As shown in FIG. 10B, a lower retention plate 726 similar to the retention plate 704 may be inserted into a pocket 430 in the lower blade skin 416. Nuts 732 may be threadedly coupled to the structural fasteners 702 on the lower side of the spar 402. The lower retention plate 726 may include raised portions 728 that do not include flat edges positioned near the openings 730, so that the nuts 732 can be rotated to tighten the fasteners 702 around the spar 402. The nuts 732 may be secured using safety wire or other conventional anti-rotation mechanisms to prevent or reduce loosening due to aircraft vibrations. The raised portions 728 may include mounting holes 730 configured to receive cover fasteners 722, similar to the mounting holes 720, to fasten a lower cover plate 734 to the lower retention plate 726. In some embodiments, the cover assembly 700 may be positioned on the lower blade skin 416 rather than the upper blade skin, with the nuts 732 instead positioned on the upper surface of the spar 402 and the heads of the fasteners 702 positioned on the lower surface of the spar 402.

Configuration of Exemplary Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A rotor blade configured to be installed on a rotary-wing aircraft, the rotor blade comprising:
    a main blade body comprising an inboard end configured to be coupled to a rotor blade hub and an outboard end;
    a blade tip removably coupled to the outboard end of the main blade body, the blade tip comprising an inner cavity; and
    a tip block comprising an inboard portion coupled to the outboard end of the main blade body and a cantilevered portion extending beyond the outboard end of the main blade body and into the inner cavity of the blade tip without directly contacting the blade tip, such that loads generated at the blade tip are transferred to the main blade body independently of the cantilevered portion.

2. The rotor blade of claim 1, wherein the cantilevered portion is cantilevered within the blade tip with sufficient clearance to not hit an inside surface of the inner cavity and does not directly contact the blade tip.

3. The rotor blade of claim 1, wherein the main blade body comprises a spar with an internal spar cavity, an upper blade skin, and a lower blade skin, and wherein the inboard portion of the tip block extends into the internal spar cavity and is coupled to the spar by a plurality of fasteners.

4. The rotor blade of claim 3, wherein the upper blade skin or the lower blade skin includes an opening exposing an outer surface of the spar and surrounding the plurality of fasteners, each fastener comprising a fastener head.

5. A rotor blade configured to be installed on a rotary-wing aircraft, the rotor blade comprising:
    a main blade body comprising an inboard end configured to be coupled to a rotor blade hub and an outboard end;
    a blade tip removably coupled to the outboard end of the main blade body, the blade tip comprising an inner cavity; and
    a tip block comprising an inboard portion coupled to the outboard end of the main blade body and a cantilevered portion extending beyond the outboard end of the main blade body and into the inner cavity of the blade tip, wherein the cantilevered portion of the tip block comprises a first weight cup cavity configured to receive one or more weights for adjusting a balance of the rotor blade.

6. The rotor blade of claim 5, wherein a first weight cartridge containing the one or more weights is structured to be received in and removably coupled to the first weight cup cavity.

7. The rotor blade of claim 6, wherein the one or more weights are removably coupled to the first weight cartridge such that the first weight cartridge and the one or more weights are configured to be installed in and removed from the first weight cup cavity without being decoupled from the first weight cartridge.

8. The rotor blade of claim 6, wherein the blade tip comprises an opening positioned above the first weight cup cavity and shaped to allow the first weight cartridge to be inserted therethrough.

9. The rotor blade of claim 8, further comprising a cover plate coupled to the first weight cartridge and shaped to cover the opening, an outer surface of the cover plate being substantially flush with an adjacent outer surface of the blade tip.

10. The rotor blade of claim 5, further comprising a second weight cup cavity configured to receive a second set of one or more weights, the second weight cup cavity positioned at the same radial station as the first weight cup cavity.

11. A rotor blade configured to be installed on a rotary-wing aircraft, the rotor blade comprising:
    a main blade body comprising an inboard end configured to be coupled to a rotor blade hub, an outboard end, a spar with an internal spar cavity, an upper blade skin, and a lower blade skin;
    a blade tip removably coupled to the outboard end of the main blade body, the blade tip comprising an inner cavity; and
    a tip block comprising an inboard portion coupled to the outboard end of the main blade body and a cantilevered portion extending beyond the outboard end of the main blade body and into the inner cavity of the blade tip, wherein the inboard portion of the tip block extends into the internal spar cavity and is coupled to the spar by a plurality of fasteners, and the upper blade skin or the lower blade skin includes an opening exposing an outer surface of the spar and surrounding the plurality of fasteners, each fastener comprising a fastener head, the rotor blade further comprising a retention plate positioned between the plurality of fastener heads and the outer surface of the spar.

12. The rotor blade of claim 11, wherein each fastener head incudes a flat edge and the retention plate includes raised portions each with a flat side positioned adjacent the flat edge of a corresponding fastener head, the flat sides and the flat edges configured to restrict the rotation of the fasteners.

13. The rotor blade of claim 12, wherein the raised portions include threaded holes configured to receive threaded fasteners for coupling a cover plate to the retention plate.

14. The rotor blade of claim 11, further comprising a cover plate coupled to the retention plate and shaped to cover the opening, an outer surface of the cover plate being substantially flush with an adjacent outer surface of the upper blade skin or the lower blade skin.

15. A rotor blade configured to be installed on a rotary-wing aircraft, the rotor blade comprising:
   a main blade body comprising an inboard end configured to be coupled to a rotor blade hub, an outboard end, a spar with an internal spar cavity, an upper blade skin, and a lower blade skin;
   a blade tip removably coupled to the outboard end of the main blade body, the blade tip comprising an inner cavity; and
   a tip block comprising an inboard portion coupled to the outboard end of the main blade body and a cantilevered portion extending beyond the outboard end of the main blade body and into the inner cavity of the blade tip, wherein the inboard portion of the tip block extends into the internal spar cavity and is coupled to the spar by a plurality of fasteners, and wherein the main blade body is coupled to the blade tip by a tip rib, the tip rib comprising:
   a mounting bracket extending into the internal spar cavity;
   an upper flange coupled to an upper tip skin of the blade tip;
   a lower flange coupled to a lower tip skin of the blade tip; and
   a gap between the upper flange and the lower flange and extending between an upper portion of the mounting bracket and a lower portion of the mounting bracket, wherein the inboard portion of the tip block extends into the gap.

16. The rotor blade of claim 15, wherein the plurality of fasteners further couple the mounting bracket to the spar and to the inboard portion of the tip block.

17. The rotor blade of claim 15, further comprising:
   a doubler plate positioned on an outer surface of the upper tip skin or the lower tip skin, the doubler plate comprising a flange that extends into a slot in the tip rib; and
   a second plurality of fasteners extending through the upper tip skin or the lower tip skin, the corresponding flange of the tip rib, and the doubler plate.

* * * * *